United States Patent [19]

Miesik

[11] Patent Number: 5,630,615
[45] Date of Patent: May 20, 1997

[54] SIDE IMPACT SUPPLEMENTAL INFLATION RESTRAINT

[75] Inventor: Glen Miesik, Madison Heights, Mich.

[73] Assignee: General Motors Corporation, Detroit, Mich.

[21] Appl. No.: 570,425

[22] Filed: Dec. 11, 1995

[51] Int. Cl.⁶ ................................................. B60R 21/22
[52] U.S. Cl. ........................... 280/730.2; 297/452.6
[58] Field of Search ..................... 280/730.2, 730.1; 297/452.6

[56] References Cited

U.S. PATENT DOCUMENTS

| | | | |
|---|---|---|---|
| 4,139,235 | 2/1979 | Elbert | 297/284 |
| 4,145,083 | 3/1979 | Urban | 297/384 |
| 4,359,200 | 11/1982 | Brevard et al. | 244/122 AG |
| 4,609,226 | 9/1986 | Yoshizawa | 297/452.6 |
| 4,805,930 | 2/1989 | Takada | 280/739 |
| 4,946,191 | 8/1990 | Putsch | 280/730 |
| 5,112,079 | 5/1992 | Haland et al. | 280/730 |
| 5,116,079 | 5/1992 | Rhodes, Jr. | 280/728.3 |
| 5,242,192 | 9/1993 | Prescaro et al. | 280/730 |
| 5,338,098 | 8/1994 | Ohnishi | 297/452.6 |
| 5,348,342 | 9/1994 | Haland et al. | 280/730 A |

FOREIGN PATENT DOCUMENTS

| | | |
|---|---|---|
| 4405927A1 | 2/1995 | Germany. |
| 3-281455 | 12/1991 | Japan. |

*Primary Examiner*—Eric D. Culbreth
*Attorney, Agent, or Firm*—Kathryn A. Marra; Ernest E. Helms

[57] ABSTRACT

A side impact supplemental inflation restraint system for an automotive vehicle is provided including a vehicle seat positioned within the vehicle and having a generally rigid frame; cushion material surrounding the frame forming a seating surface; a cover enclosing the frame and cushion material; an inflatable air bag positioned within the cushion material for penetrating through the cover and outward extension upon a side impact of the vehicle; and a blocking panel with a first end anchored to the seat frame and a second end anchored to the cover to prevent the travel of the air bag upon deployment between the cushion and cover along an undesired portion of the vehicle seat.

2 Claims, 2 Drawing Sheets

SIDE IMPACT SUPPLEMENTAL INFLATION RESTRAINT

FIELD OF THE INVENTION

The field of the present invention is that of a supplemental inflation restraint (SIR) for an automotive vehicle and, more particularly, for protecting a vehicle occupant during a side impact.

BACKGROUND OF THE INVENTION

Currently, there is much development work being undertaken in the utilization of SIRs, sometimes referred to as air bags, to protect vehicle occupants during side collisions. One of the important factors in maximizing occupant protection is having the correct relationship between the position of the occupant and the air bag upon inflation.

Experimentally, air bags have been placed in vehicle doors. However, when utilized for side impact, due to the fore and aft adjustment of the vehicle seat, the exact position of the vehicle occupant with respect to the air bag is a variable. To minimize the aforementioned variable, the utilization of SIRs which are actually mounted to the vehicle seat have been proposed, thereby keeping constant the positional relationship of the air bag to the seat occupant.

SUMMARY OF THE INVENTION

The present invention provides an SIR system for a vehicle seat in contrast to those proposed previously wherein the SIR system preferably is mounted within a wing of the vehicle seat and extends through the vehicle seat through a tear in a sewn seam. Additionally, the present invention provides a method to prevent entrapment of the air bag between the vehicle seat cushion and the cover to prevent deployment of the air bag between the cushion material of the seat and the cover in areas where it may be less desired.

DESCRIPTION OF THE PREFERRED EMBODIMENT

Figure 1:
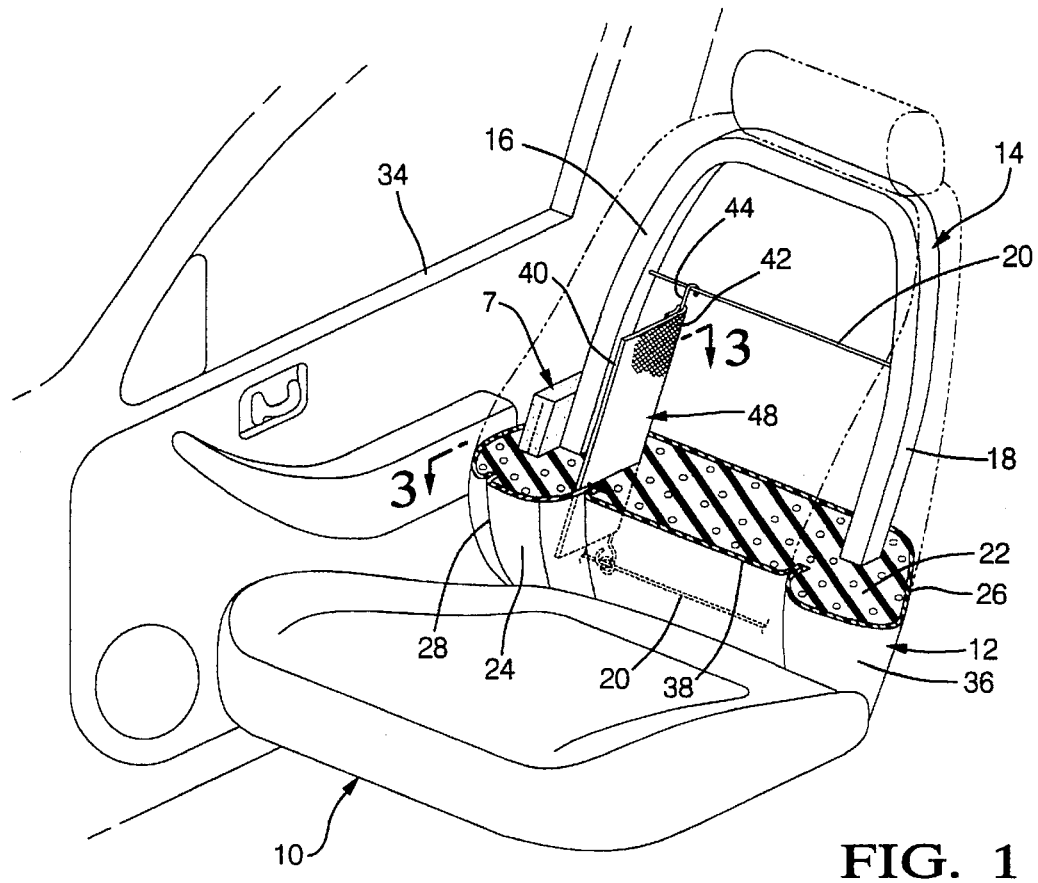
FIG. 1 is a perspective view of a vehicle seat which utilizes an SIR side impact system according to the present invention with portions of a seatback being sectioned to expose various components of the SIR system.
Figure 2:
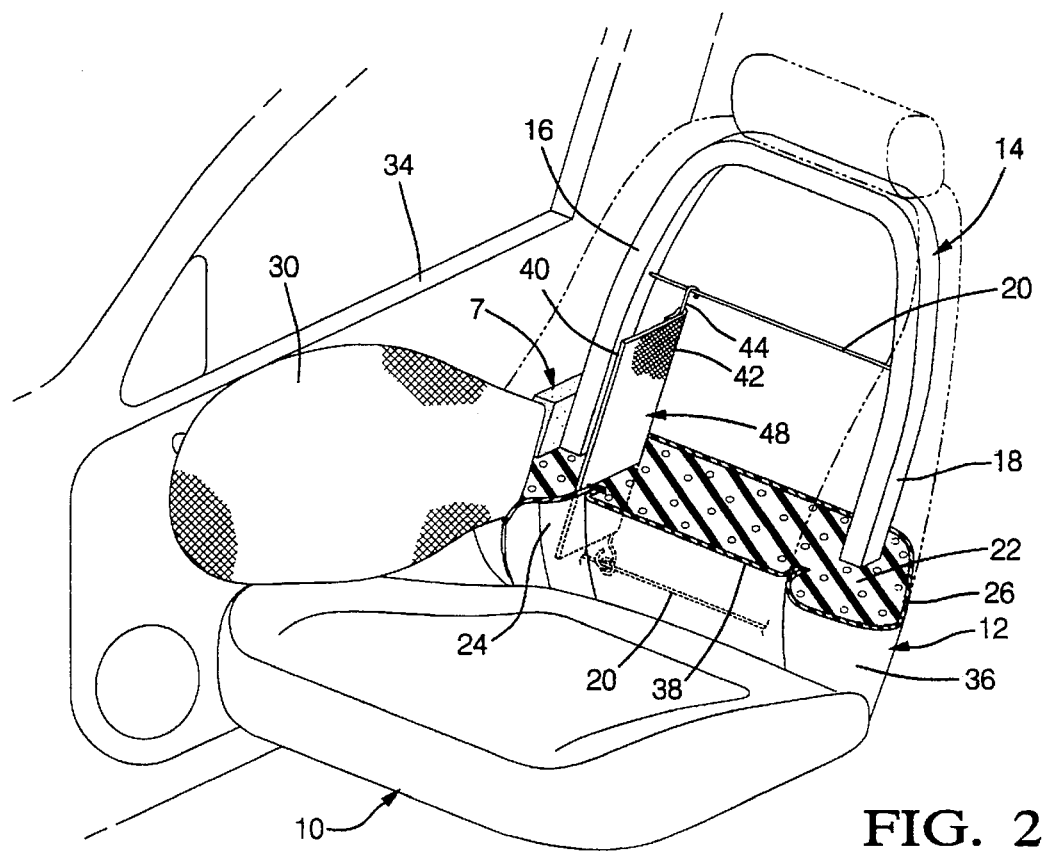
FIG. 2 is a view similar to that of FIG. 1 illustrating deployment of an air bag of the SIR system shown in FIG. 1.
Figure 3:
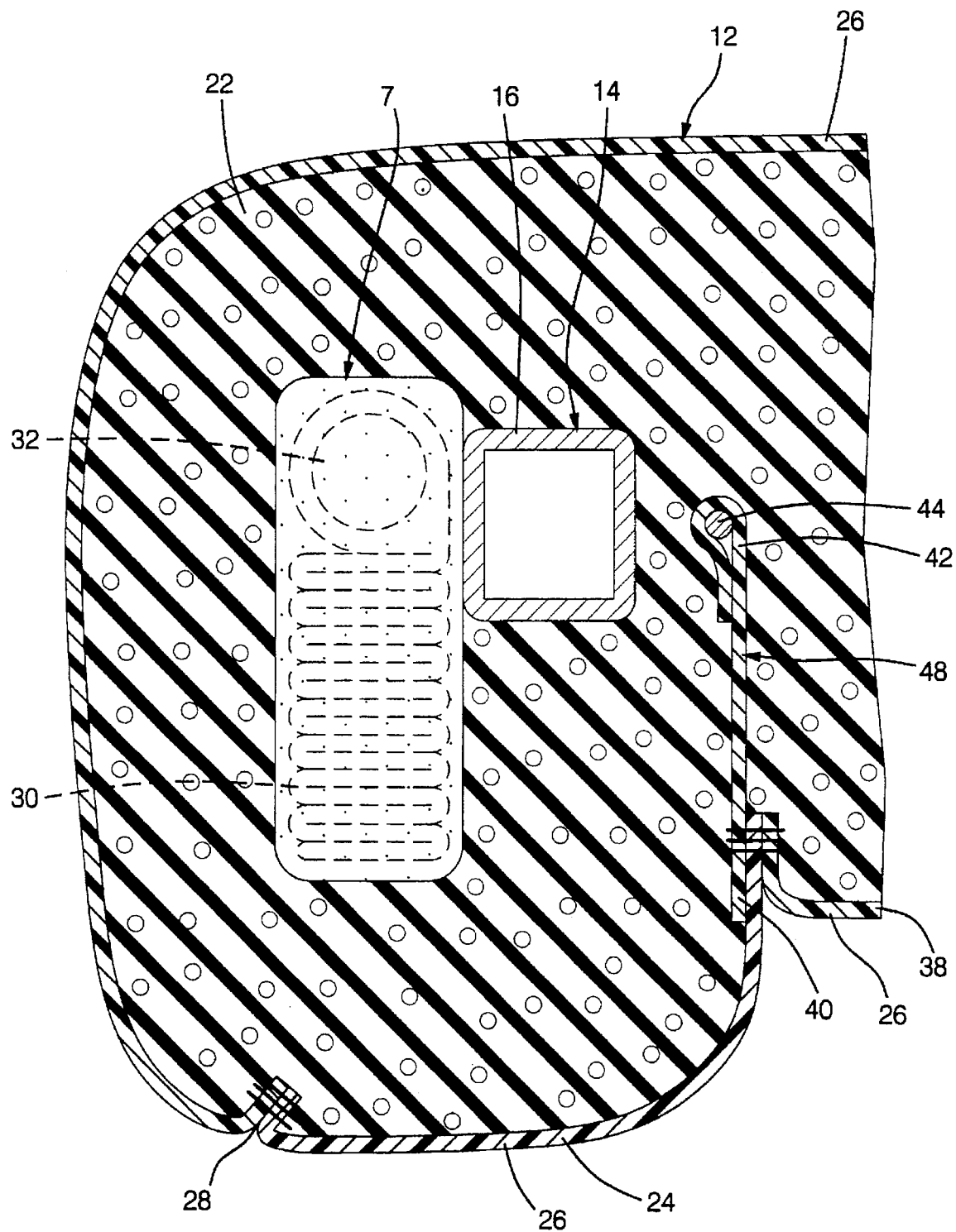
FIG. 3 is an enlarged view taken along line 3—3 of FIG. 1.

Referring to FIG. 1, an SIR system 7 according to the present invention has a seat 10 with a seatback 12. The seatback 12 has a U-shaped frame 14 with legs 16 and 18. Extending between the seatback legs 16 and 18 are a plurality of spring wires 20 (only two shown).

At least partially enclosing the seatback frame 14 is a cushion material 22. The cushion material is configured to have an outboard wing 24 and an inboard wing 36. The cushion material which surrounds the frame 14 forms a seating surface for the seat 10. At least partially enclosing the cushion material is a cover 26. The cover 26 along the wing 24 has a sewn seam 28.

Placed within the wing 24 is an air bag 30 along with its inflator 32. Upon an impact along the side 34 of the vehicle, the inflator 32 will inflate the air bag 30 to extend out through the wing 24 and penetrate the seat cover 26 by tearing open the seam 28.

If seam 28 does not open as designed, the air bag 36 will tend to force itself between the seat cushion material 22 and the cover 26. The air bag will not be able to extend between the seat cushion material 22 and the seat cover 26 along a seatback portion 38 of the vehicle seat due to a blocking panel 48. Blocking panel 48 has a second end 40 which is anchored by stitching to the seat cover 26 and a first end 42 which is anchored to the seat frame 14 by virtue of spring wires 20 and hook wire 44.

While this invention has been described in terms of a preferred embodiment thereof, it will be appreciated that other forms could readily be adapted by one skilled in the art. Accordingly, the scope of this invention is to be considered limited only by the following claims.

What is claimed is:

1. A side impact supplemental inflation restraint (SIR) system for an automotive vehicle comprising:

a vehicle seat positioned within the vehicle, the seat having a generally rigid frame, the frame having at least two leg portions connected by extending wires;

cushion material surrounding the frame forming a seating surface;

a cover enclosing the frame and cushion material;

an inflatable air bag positioned within the cushion material for penetrating through the cover and outward extension upon a side impact of the vehicle; and a blocking panel with a first end anchored with respect to the seat frame and a second end anchored with respect to the cover to prevent the travel of the air bag upon deployment between the cushion and cover along an undesired portion of the vehicle seat, the first end of the blocking panel being connected to the wires which extend between the leg portions of the frame.

2. A side impact supplemental inflation restraint (SIR) system for an automotive vehicle comprising:

a vehicle seat positioned adjacent a side of the vehicle, the seat having a generally rigid U-shaped seatback frame with leg portions and wires connecting the leg portions;

cushion material surrounding the seatback frame forming a seating surface, the cushion forming a wing portion of the seat generally adjacent the side of the vehicle and a seat back portion of the seat;

a cover enclosing the frame and the cushion material, the cover having a sewn seam generally adjacent the wing portion of the seatback;

an air bag and inflator positioned within the cushion material in the wing portion of the seatback, the air bag being inflated by the inflator for outward extension upon a side impact of the vehicle wherein the air bag penetrates the seam of the cover and extends generally forward from the seatback; and a blocking panel with a first end anchored to the wires and a second end anchored to the seat cover to prevent the travel of the air bag upon deployment between the cushion and cover along the seatback portion of the vehicle seat.

* * * * *